US010947942B2

(12) United States Patent
Stritzel et al.

(10) Patent No.: US 10,947,942 B2
(45) Date of Patent: Mar. 16, 2021

(54) HIGH-PRESSURE FUEL PUMP

(71) Applicant: Robert Bosch GmbH, Stuttgart (DE)

(72) Inventors: Soeren Stritzel, Rayong (TH); Erich Buerner, Lauf (DE); Peter Ropertz, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 16/303,086

(22) PCT Filed: Mar. 23, 2017

(86) PCT No.: PCT/EP2017/056938
§ 371 (c)(1),
(2) Date: Nov. 19, 2018

(87) PCT Pub. No.: WO2017/198371
PCT Pub. Date: Nov. 23, 2017

(65) Prior Publication Data
US 2019/0293038 A1 Sep. 26, 2019

(30) Foreign Application Priority Data

May 19, 2016 (DE) ...................... 10 2016 208 625.1
Jul. 22, 2016 (DE) ...................... 10 2016 213 451.5

(51) Int. Cl.
*F02M 59/48* (2006.01)
*B23K 11/093* (2006.01)
*B23K 11/26* (2006.01)

(52) U.S. Cl.
CPC ........... *F02M 59/48* (2013.01); *B23K 11/093* (2013.01); *B23K 11/26* (2013.01); *F02M 2200/8015* (2013.01); *F02M 2200/8053* (2013.01); *F02M 2200/8084* (2013.01)

(58) Field of Classification Search
CPC ........... F02M 59/48; F02M 2200/8015; F02M 2200/8053; F02M 2200/8084; B23K 11/093; B23K 11/26
See application file for complete search history.

(56) References Cited

U.S. PATENT DOCUMENTS

2009/0110575 A1* 4/2009 Munakata .............. F02M 59/48
417/437

FOREIGN PATENT DOCUMENTS

| CN | 101080571 A | 11/2007 |
| CN | 102059437 A | 5/2011 |
| DE | 103 22 595 A1 | 12/2004 |
| DE | 10 2004 015 440 A1 | 10/2005 |

(Continued)

OTHER PUBLICATIONS

International Search Report corresponding to PCT Application No. PCT/EP2017/056938, dated Jun. 23, 2017 (German and English language document) (7 pages).

*Primary Examiner* — Xiao En Mo
(74) *Attorney, Agent, or Firm* — Maginot, Moore & Beck LLP

(57) ABSTRACT

A high-pressure fuel pump for a fuel injection system of an internal combustion engine includes a pump housing and at least one fastening flange that is fixed to the pump housing by a welding. The welding has one weld region and at least one weld bead arranged laterally from the weld region. The weld bead is arranged in a receiving space formed between the pump housing and the fastening flange.

13 Claims, 2 Drawing Sheets

(56) References Cited

FOREIGN PATENT DOCUMENTS

| | | |
|---|---|---|
| DE | 10 2005 007 806 A1 | 7/2006 |
| EP | 2 055 934 A2 | 5/2009 |
| JP | 2004-017048 A | 1/2004 |
| JP | 2006-250122 A | 9/2006 |
| JP | 2009-108784 A | 5/2009 |
| JP | 2010-106740 A | 5/2010 |
| JP | 2011-177715 A | 9/2011 |
| JP | 2013-199873 A | 10/2013 |
| WO | 2013/125382 A1 | 8/2013 |

* cited by examiner

HIGH-PRESSURE FUEL PUMP

This application is a 35 U.S.C. § 371 National Stage Application of PCT/EP2017/056938, filed on Mar. 23, 2017, which claims the benefit of priority to Serial Nos. DE 10 2016 208 625.1, filed on May 19, 2016 in Germany, and DE 10 2016 213 451.5, filed on Jul. 22, 2016 in Germany, the disclosures of which are incorporated herein by reference in their entirety.

BACKGROUND

The disclosure relates to a high-pressure fuel pump.

A high-pressure fuel pump of this kind is known from DE 10 2005 007 806 A1 and comprises a pump housing and a fixing flange. The fixing flange is fixed to the pump housing by a welded joint and has at least one connecting region, on which a connecting element engages in the installed position. By means of the latter, the piston pump can be fixed to a holding body.

SUMMARY

The object underlying the disclosure is achieved by a high-pressure fuel pump having the features of the disclosure. Advantageous developments of the disclosure are indicated in dependent claims. Moreover, features of importance to the disclosure can be found in the following description and in the drawing. These features may be important for the disclosure in isolation or in various combinations.

The disclosure prevents the free surface of the weld bead which emerges at the edge of the weld region from coming into contact with the cold housing wall, e.g. that of the pump housing or of the fixing flange, during the welding process. This in turn prevents the formation of welding splashes, which may damage the pump housing and/or the fixing flange and/or the weld region (referred to in general as the "weld seam"). The disclosure thus ensures that the connection between the pump housing and the fixing flange is produced in an optimum way and without negative effects on the components involved.

It is particularly advantageous here if the welded joint is produced by means of capacitor discharge welding. This is a particularly low-cost and rapid method of welding. In capacitor discharge welding, the energy required for welding is connected to a welding transformer via a thyristor from pre-charged capacitors. Here, the charging times are in a range between 0.5 s and 2 s, and the welding times between 3 and 10 ms. In parallel with this, the effective resistance applied by the welding preparation makes the temperature at the welding location rise at a very rapid rate. This rapid temperature rise heats the welding zone before the heat can dissipate and thus prevents heating of the regions around the welding location. After just a few milliseconds, the projection has been welded without the surroundings of the welding location having been completely warmed up before this happens. By virtue of this concentration of the introduced energy within the volume to be heated, the efficiency of capacitor discharge welding is very high. It is thus a very economical method.

It is furthermore proposed that the receiving space is wider than the weld bead when viewed in the radial direction. This is a particularly effective way of preventing the free surface of the weld bead from coming into contact with the cold wall of the pump housing or of the fixing flange.

In the case of a circumferential fixing flange, it is advantageous if the receiving space is an annular space. It can then be produced in a very simple and economical manner by means of a circumferential groove, for example.

It is furthermore advantageous if the high-pressure fuel pump comprises an opening which connects the receiving space to the environment. This prevents an unwanted high pressure arising in the receiving space owing to the welding process and the temperature increase in the region of the welding location or of the welded joint.

A simple variant for the production of the receiving space consists in that the receiving space is at least also formed by a recess in the pump housing. In a similar way, the receiving space can be at least also formed by a recess in the fixing flange. It is also possible for the receiving space to be formed both by a recess in the pump housing and by a recess in the fixing flange.

Another development is distinguished by the fact that a relief cut, which has a smaller diameter than a contact section of the pump housing, is present in the pump housing, wherein the contact section makes contact with the fixing flange, preferably with a press fit. This allows simple installation of the fixing flange since the pressing of the fixing flange onto the pump housing takes place only in the region of the contact section.

BRIEF DESCRIPTION OF THE DRAWINGS

Embodiments of the disclosure are explained below with reference to the attached drawing. In the drawing.

Elements and regions which have equivalent functions in the following figures bear the same reference signs.

DETAILED DESCRIPTION

Figure 1:
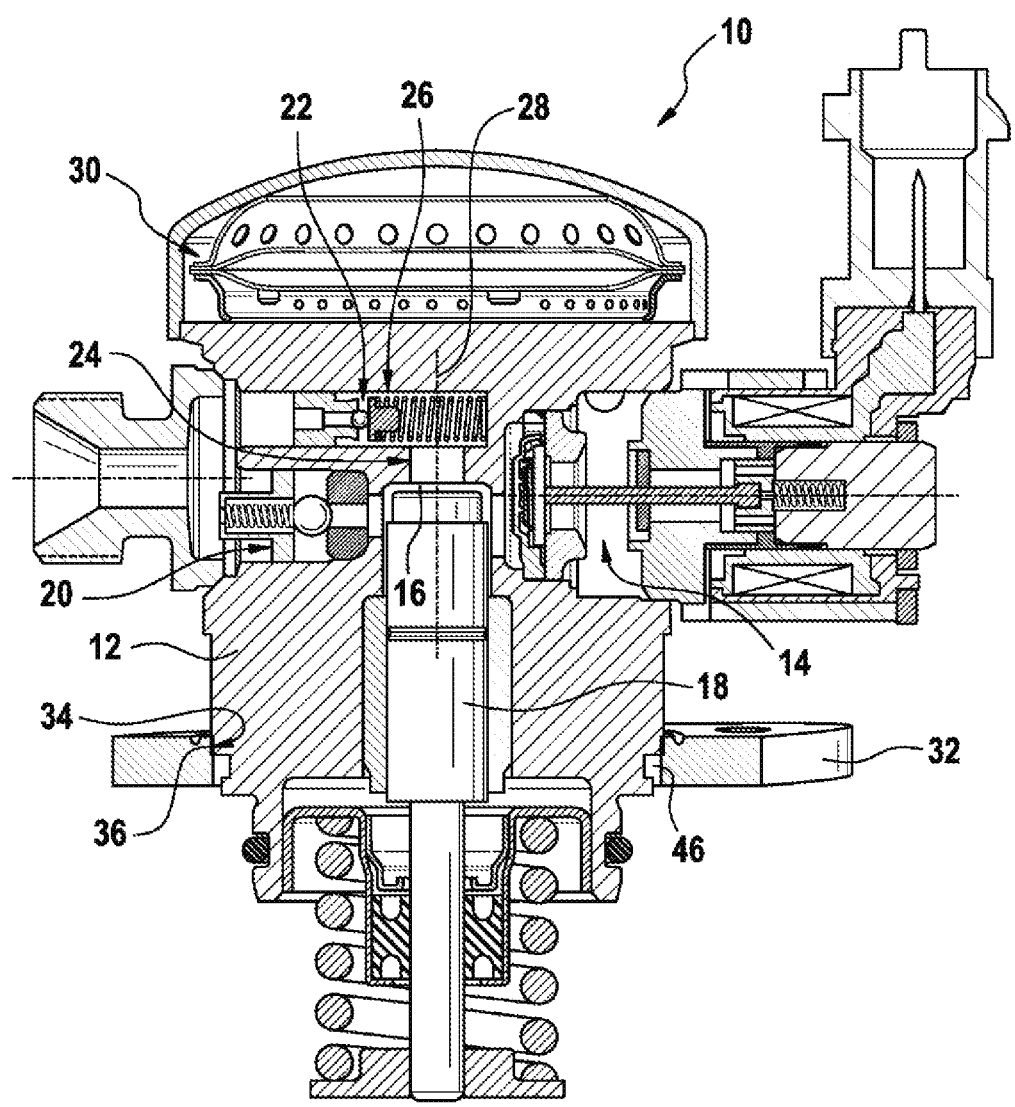
FIG. 1 shows a longitudinal section through a first embodiment of a high-pressure fuel pump having a pump housing, a fixing flange and a weld region.

In FIG. 1, a high-pressure fuel pump for an internal combustion engine (not shown specifically) bears the reference sign 10 overall. The high-pressure fuel pump 10 has a pump housing 12 which is substantially cylindrical overall and in or on which the essential components of the high-pressure fuel pump 10 are arranged. Thus, the high-pressure fuel pump 10 has an inlet/quantity control valve 14, a delivery plunger 18, which is arranged in a delivery chamber 16 and to which a reciprocating motion can be imparted by a drive shaft (not shown), an outlet valve 20 and a pressure relief valve 22.

In the housing 12, there is a first passage 24, which extends coaxially with the delivery chamber 16 and with the delivery plunger 18 and which leads from the delivery chamber 16 to a second passage 26, which is arranged at an angle of 90° to the first passage 24 and in which the pressure relief valve 22 is accommodated. In FIG. 1, a longitudinal axis of the pump housing 12 bears the reference sign 28 overall. At the top in FIG. 1, a pressure damper 30 is arranged in the pump housing 12.

In operation, fuel is drawn into the delivery chamber 16 by the delivery plunger 18 via the inlet and quantity control valve 14 during a suction stroke. During a delivery stroke, the fuel in the delivery chamber 16 is compressed and expelled via the outlet valve 20 into a high-pressure region (without a reference sign), for example, to a common fuel line ("rail"), for example, where the fuel is stored under high pressure. Here, the fuel quantity expelled during a delivery stroke is set by means of the electromagnetically actuated inlet and quantity control valve 14. If there is an impermissible excess pressure in the high-pressure region, the pressure relief valve 22 opens, thereby enabling fuel to flow out of the high-pressure region into the delivery chamber 16.

The high-pressure fuel pump 10 is a "plug-in pump", which can be inserted into a corresponding opening in a cylinder head of the internal combustion engine. A circumferential and annular fixing flange 32 is fixed to the pump housing 12 and, by means of said flange, the high-pressure fuel pump 10 can be fixed, e.g. screwed, to the cylinder head. As can be seen in detail from FIG. 2, the fixing flange 32 is fixed to the pump housing 12 by a welded joint 34, which comprises a weld region 36 and two weld beads 38 and 40 arranged laterally with respect to the weld region 36. The welded joint 34 is produced by means of capacitor discharge welding.

A length L1 of the weld region 36 is produced by an overlap between a radially outer contact section 42 on the pump housing 12 and a radially inner contact section 44 on the fixing flange 32, said contact section having a length or height L2. In the present case, the contact sections 42 and 44 make contact with each other with a press fit. In the embodiment illustrated in FIGS. 1 and 2, a receiving space 46 designed as an annular space, which is formed by a circumferential groove 47 in an outer wall of the pump housing 12, is present on the outside of the pump housing 12, directly below the weld region 36.

Figure 2:
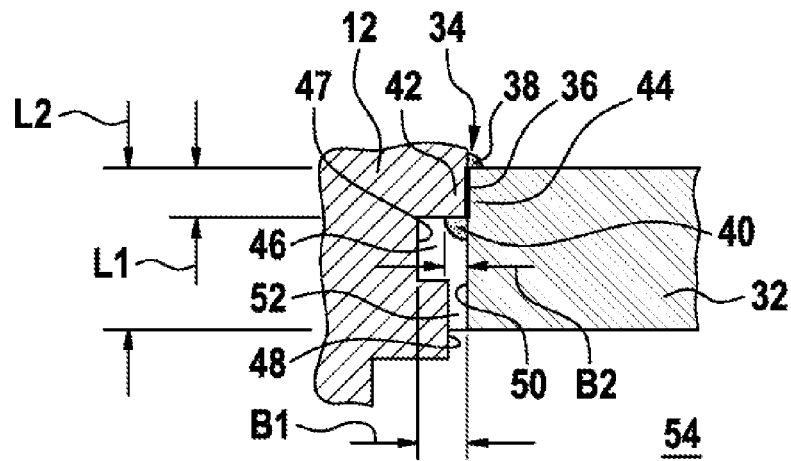
FIG. 2 shows an enlarged detail of the weld region from FIG. 1.

The weld bead 40 at the bottom in FIG. 2 is arranged in the receiving space 46. In this case, the receiving space 46 is wider than the weld bead 40 when viewed in the radial direction. In FIG. 2, an extent B1 of the receiving space 46 is therefore greater than an extent B2 of the weld bead 40. Similarly, the receiving space 46 is also higher than the weld bead 40 in the axial direction, i.e. parallel to the longitudinal axis 28. For reasons of clarity, however, the corresponding extents are not shown in FIG. 2 and are not provided with reference signs.

The size ratios of the receiving space 46 relative to the lower weld bead 40 ensure that a free surface of the weld bead 40, which in the present case has the idealized shape of a quarter circle in cross section, is not in contact with the radially outer circumferential wall of the pump housing 12. As can be seen from FIG. 2, there is a circumferential gap between a radially outer lateral surface 48 of the pump housing 12, the lateral surface being situated below the receiving space 46, and a radially inner lateral surface 50 of the fixing flange 32, said gap forming an opening 52, which connects the receiving space 46 to an environment 54.

It can be seen from FIG. 2 that the diameter of the pump housing 12 is smaller in the region of the radially outer lateral surface 48 arranged below the receiving space 46 in the figure than in the region of contact section 42 arranged above the receiving space 46 in the figure. This makes it possible to use the fixing flange 32 of the pump housing 12 as a "clamping diameter" in the region of the radially outer lateral surface 48 during pre-mounting of the fixing flange 32 on the pump housing 12.

Figure 3:
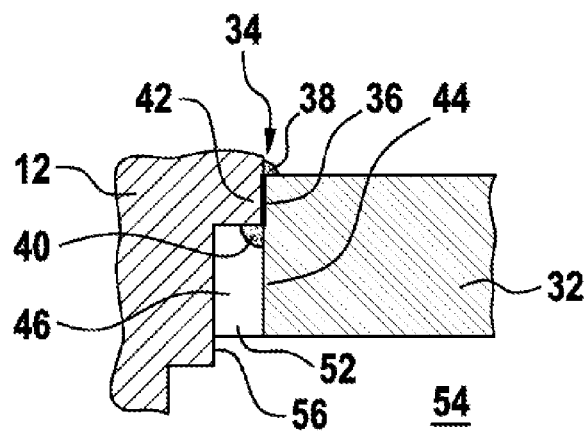
FIG. 3 shows an illustration similar to FIG. 2 of a second embodiment.

FIG. 3 shows an alternative embodiment. In this embodiment, the receiving space 46 is formed not by a groove but simply by what is referred to as a plunge cut 56 in the pump housing 12, wherein the plunge cut 56 is arranged directly below contact section 42 in the figure.

Figure 4:
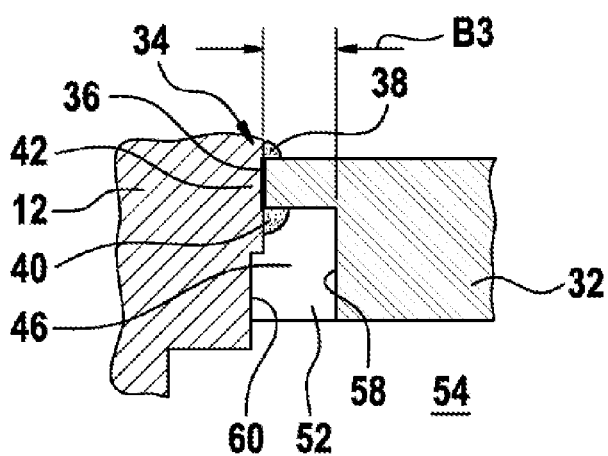
FIG. 4 shows an illustration similar to FIG. 2 of a third embodiment.

In the embodiment in FIG. 4, the receiving space 46 is formed by a plunge cut 58 in the fixing flange 32, wherein the plunge cut 58 is arranged directly below contact section 44 in the figure. In the embodiment shown in FIG. 4, there is furthermore additionally also a relief cut 60 in the pump housing 12 opposite the plunge cut 58 in the fixing flange 32, said relief cut 60 being at some distance from contact section 42, however, and having only a slightly smaller diameter than contact section 42.

The relief cut 60 allows simple installation of the fixing flange 32 since the press-fitting of the fixing flange 32 onto the pump housing 12 takes place only in the region of contact section 42. In other respects, attention is drawn to the fact that it is possible, by means of a radial dimension B3, which indicates the depth of the plunge cut 58 in the fixing flange 32, to influence the elastic properties of the fixing flange 32 in this region. It is thereby possible to adjust the effect of the screwing of the fixing flange onto the cylinder head on the loading of the welded joint 34. The geometrical configuration of contact section 44 on the fixing flange 32 also offers such a means of influence.

The invention claimed is:

1. A high-pressure fuel pump for a fuel injection system of an internal combustion engine, comprising:
    a pump housing; and
    at least one fixing flange that is fixed to the pump housing by a welded joint, the welded joint including a weld region and at least one weld bead arranged laterally with respect to the weld region,
    wherein the weld bead is arranged in a receiving space formed between the pump housing and the fixing flange by a circumferential groove in one of the pump housing and the fixing flange, and wherein an opening connects the receiving space to an environment.

2. The high-pressure fuel pump as claimed in claim 1, wherein the welded joint is formed via capacitor discharge welding.

3. The high-pressure fuel pump as claimed in claim 1, wherein the receiving space is wider than the weld bead when viewed in a radial direction.

4. The high-pressure fuel pump as claimed in claim 1, wherein the receiving space is an annular space.

5. The high-pressure fuel pump as claimed in claim 1, wherein the pump housing includes a relief cut that is arranged within the receiving space and has a smaller diameter than a contact section of the pump housing, and wherein the contact section makes contact with the fixing flange.

6. The high-pressure fuel pump as claimed in claim 5, wherein the contact between the contact section and the fixing flange is a press fit.

7. The high-pressure fuel pump as claimed in claim 1, wherein the environment is external to the pump housing.

8. The high-pressure fuel pump as claimed in claim 1, wherein the fixing flange is configured to be fixed directly to the internal combustion engine.

9. The high-pressure fuel pump as claimed in claim 1, wherein the pump housing partially encircles the receiving space to define the circumferential groove such that the receiving space is bounded longitudinally above and below by the pump housing.

10. The high-pressure fuel pump as claimed in claim 1, wherein the receiving space has a first circumferential gap between the pump housing and the fixing flange, the opening has a second circumferential gap between the pump housing and the fixing flange, and the first circumferential gap is larger than the second circumferential gap.

11. The high-pressure fuel pump as claimed in claim 1, wherein the pump housing has a longitudinal axis, and wherein the circumferential groove is recessed in the one of the pump housing and the fixing flange laterally with respect to the longitudinal axis.

12. The high-pressure fuel pump as claimed in claim 11, wherein the circumferential groove is recessed laterally inwardly in a lateral surface of the pump housing.

13. The high-pressure fuel pump as claimed in claim 11, wherein the circumferential groove is recessed laterally outwardly in a lateral surface of the fixing flange.

\* \* \* \* \*